(12) United States Patent
Gambioli et al.

(10) Patent No.: US 12,715,604 B2
(45) Date of Patent: Aug. 25, 2026

(54) AIRCRAFT FUEL STORAGE SYSTEM

(71) Applicants: AIRBUS OPERATIONS LIMITED, Bristol (GB); AIRBUS OPERATIONS (S.A.S.), Toulouse Cedex (FR); AIRBUS OPERATIONS GmbH, Hamburg (DE)

(72) Inventors: Francesco Gambioli, Bristol (GB); Kei Philipp Behruzi, Bremen (DE); Jörg Klatte, Bremen (DE); Damien Guilloteau, Toulouse (FR)

(73) Assignees: AIRBUS OPERATIONS LIMITED, Bristol (GB); AIRBUS OPERATIONS (S.A.S.), Toulouse (FR); AIRBUS OPERATIONS GmbH, Hamburg (DE)

( * ) Notice: Subject to any disclaimer, the term of this patent is extended or adjusted under 35 U.S.C. 154(b) by 177 days.

(21) Appl. No.: 18/415,000

(22) Filed: Jan. 17, 2024

(65) Prior Publication Data

US 2024/0239510 A1 Jul. 18, 2024

(30) Foreign Application Priority Data

Jan. 18, 2023 (EP) .................................... 23305060

(51) Int. Cl.

*B64D 37/22* (2006.01)
*B64D 37/30* (2006.01)
*F17C 13/00* (2006.01)

(52) U.S. Cl.

CPC ............ *B64D 37/22* (2013.01); *B64D 37/30* (2013.01); *F17C 13/005* (2013.01);
(Continued)

(58) Field of Classification Search

CPC ..... B64D 37/22; B64D 37/30; F17C 13/0057; F17C 2221/012; F17C 2223/0161; F17C 2223/046
(Continued)

(56) References Cited

U.S. PATENT DOCUMENTS

| | | | |
|---|---|---|---|
| 2,940,631 | A | 6/1960 | Keeping |
| 3,979,005 | A | 9/1976 | Robinson et al. |

(Continued)

FOREIGN PATENT DOCUMENTS

| | | | | |
|---|---|---|---|---|
| CN | 204623128 | U | 9/2015 | |
| CN | 107336838 | A * | 11/2017 | ............. B64D 37/20 |

(Continued)

OTHER PUBLICATIONS

Extended Search Report for EP23305060.8, dated Jun. 19, 2023, 5 pages.

*Primary Examiner* — Orlando E Aviles
*Assistant Examiner* — Niki M Eloshway
(74) *Attorney, Agent, or Firm* — Nixon & Vanderhye, PC

(57) ABSTRACT

An aircraft fuel storage system is disclosed including a fuel tank comprising a chamber for storing fuel, the chamber comprising a first side, a second side, and a base connecting the first side to the second side; a collector; and a first conduit and a second conduit, each of the first and second conduits fluidically coupling the chamber to the collector so that fuel is freely passable from the chamber to the collector via the respective first and second conduits. The first and second conduits open into the chamber at respective first and second conduit openings, the first conduit opening is nearer to the first side than the second conduit opening is to the first side, and the second conduit includes a second conduit lock portion that is nearer to the first side than the second conduit
(Continued)

opening is to the first side. Also disclosed is an aircraft including the aircraft fuel storage system.

17 Claims, 2 Drawing Sheets

(52) U.S. Cl.
CPC ............................ *F17C 2221/012* (2013.01); *F17C 2223/0161* (2013.01); *F17C 2223/046* (2013.01); *F17C 2227/0135* (2013.01); *F17C 2260/016* (2013.01); *F17C 2265/066* (2013.01); *F17C 2270/0189* (2013.01)

(58) Field of Classification Search
USPC ........................................................ 220/4.14
See application file for complete search history.

(56) References Cited

U.S. PATENT DOCUMENTS 9,108,738 B1* 8/2015 Tweet .................... B64D 37/14
2003/0015536 A1* 1/2003 Tekulve ............. B62D 49/0671 220/562
2005/0166967 A1* 8/2005 Howe .................... B64D 37/06 137/399
2009/0050743 A1* 2/2009 Barbosa ................. B64D 37/08 244/135 R
2011/0272526 A1* 11/2011 Barbosa .................. B64C 17/10 244/135 R
2013/0233850 A1* 9/2013 Treudt .................... F01N 3/208 220/501
2014/0144917 A1 5/2014 Meillat et al.
2021/0347252 A1* 11/2021 Giambartolomei .......................... F02M 37/0088
2022/0146047 A1 5/2022 Bensadoun et al.
2022/0388658 A1 12/2022 Sanz Lopez et al.

FOREIGN PATENT DOCUMENTS

CN 111056021 A 4/2020
CN 113525698 A * 10/2021 ............. B64D 37/06
EP 2735513 A1 * 5/2014 ............. B64D 37/22
FR 2621562 A1 4/1989
GB 580006 A 8/1946
WO 2021063457 A1 4/2021

* cited by examiner

AIRCRAFT FUEL STORAGE SYSTEM

CROSS RELATED APPLICATION

This application claims priority to European Patent Application EP23305060.8, filed on Jan. 18, 2023, the entire contents of which is hereby incorporated by reference.

TECHNICAL FIELD

The present invention relates to aircraft fuel storage systems, and aircraft comprising aircraft fuel storage systems.

BACKGROUND

When an aircraft performs manoeuvres during flight, such as pitching or rolling manoeuvres, fuel may move around in a fuel tank of the aircraft, particularly as a level of fuel in the fuel tank reduces. Scavenger pumps may therefore be provided in such fuel tanks to pump fuel from the fuel to a smaller, intermediate fuel tank. The intermediate fuel tank may be kept topped up with fuel, so that an outlet of the intermediate fuel tank may be more likely to remain submerged in fuel when the aircraft performs manoeuvres. This may ensure a continuous supply of fuel to engines of the aircraft during such manoeuvres.

SUMMARY

A first aspect of the present invention provides an aircraft fuel storage system comprising: a fuel tank comprising a chamber for storing fuel, the chamber comprising a first side, a second side, and a base connecting the first side to the second side. The aircraft fuel storage system also comprises a collector, a first conduit, and a second conduit, each of the first and second conduits fluidically coupling the chamber to the collector so that fuel is freely passable from the chamber to the collector via the respective first and second conduits. The first and second conduits open into the chamber at respective first and second conduit openings, wherein the first conduit opening is nearer to the first side than the second conduit opening is to the first side. The second conduit comprises a second conduit lock portion that is nearer to the first side than the second conduit opening is to the first side.

In this way, when the fuel tank is in a nominal orientation, in which a fuel surface of fuel in the fuel tank is above both the first and second conduit openings, fuel in the chamber may pass into the collector via one or both of the first and second conduits under the action of gravity, and/or due to a reduction of pressure in the collector, such as due to an extraction of fuel from the collector. In the event that the fuel tank is tilted from the nominal orientation to a first tilted orientation, in which the second end is raised relative to the first end in the direction of gravity, the fuel surface in the chamber may drop below the second conduit opening but remain above the first conduit opening, which may depend on an amount of fuel present in the chamber and an extent to which the fuel tank is tilted. In such a tilted orientation of the fuel tank, fuel may be present in at least a part of the second conduit when the second conduit lock portion remains below a fuel surface plane that generally defines a height of the fuel surface in the chamber in the direction of gravity. In other words, fuel may be present in the second conduit lock portion when the second conduit opening opens into an ullage space in the chamber above the fuel surface plane and the first conduit opening is submerged in the fuel in the chamber when the part of the second conduit lock portion remains below the fuel surface plane.

The fuel present in the second conduit lock portion in the tilted orientation of the fuel tank may prevent a gas in the ullage space from entering the collector via the second conduit. In other words, the fuel in the second conduit lock portion may act as a fluid lock. The second conduit lock portion may thereby reduce or eliminate an amount of the gas entering the collector when an aircraft comprising the aircraft fuel storage system performs a manoeuvre, such as a pitching manoeuvre, that causes the liquid level in the fuel tank to drop below the second conduit opening but remain above the first conduit opening. Moreover, since the first conduit remains submerged in the first tilted position of the fuel tank, as fuel is extracted from the collector, in use (such as by a pump downstream of the collector), a siphon effect may cause fuel from the chamber to pass passively into the collector via the first conduit. Thus, the present invention may ensure that the collector is substantially full of fuel in the event of such a pitching manoeuvre, even as fuel is extracted from the collector. This may, in turn, allow fuel to continue to be extracted from the collector (and the chamber) during the pitching manoeuvre, such as without requiring a separate pump for pumping fuel from the fuel tank to the collector. The invention may also prevent the gas in the chamber being passed to the collector, and/or to one or more components (such as a pump) downstream of the collector, in use. This may improve a longevity of the component(s) downstream of the collector.

Optionally, the collector comprises a collector outlet through which fuel can be extracted from the collector, in use. Optionally, the aircraft fuel storage system comprises a pump configured to cause fuel to move from the collector, via the collector outlet, to a system downstream of the collector, such as to another fuel tank and/or an engine of the aircraft. As fuel is extracted from the collector, in use, fuel from the chamber may be siphoned into the collector via the first and/or second conduit, when each of the first and second conduit openings is submerged in fuel in the tank, or via the first conduit, when the second conduit opening is above the fuel surface in the chamber, such as when the tank is in the first tilted orientation.

Optionally, except for the first and second conduits, the collector is fluidically isolated from the chamber. Optionally, the collector is fluidically isolated from the chamber by a gas relief valve, which is configured to permit a flow of gas from the collector to the tank, but to prevent fluid entering the collector from the chamber via the gas relief valve. This may allow any gas present in the tank, such as due to operation of the pump (where provided) when there is no fluid present in the first and second conduits and/or the collector. This may improve a longevity of such a pump and/or or other components downstream of the collector by reducing or eliminating an amount of gas that is passed to the pump and/or other components, in use.

Optionally, the first conduit opening is nearer to the first side than to the second side. In this way, the first conduit opening is more likely to be submerged in fuel in the chamber, in use, when the fuel tank is tilted to the first tilted orientation. This may improve a likelihood that fuel can be passed from the chamber to the collector via the first conduit during manoeuvres of an aircraft comprising the aircraft fuel storage system that cause the fuel tank to be tilted to the first tilted orientation. This may, in turn, allow the collector to remain substantially full of fuel during such manoeuvres.

Optionally, the second conduit opening is nearer to the second side than to the first side. In the event that the fuel tank is tilted from the nominal orientation to a second tilted orientation, in which the first side is raised relative to the second side in the direction of gravity, the fuel surface in the chamber may drop below the first conduit opening but remain above the second conduit opening. By providing the second conduit opening that is nearer to the second side than to the first side, the second conduit opening is more likely to be submerged in fuel in the chamber, in use, when the fuel tank is tilted to the second tilted orientation. This may improve a likelihood that fuel can be passed from the chamber to the collector via the second conduit during manoeuvres of an aircraft comprising the aircraft fuel storage system that cause the fuel tank to be tilted to the second tilted orientation. This may, in turn, allow the collector to remain substantially full of fuel during such manoeuvres.

Optionally, the first conduit comprises a first conduit lock portion, which is nearer to the second side than the first conduit opening is to the second side. By providing the first conduit lock portion that is nearer to the second side than the first conduit opening is to the second side, fuel may remain in the first conduit lock portion in the event that the fuel tank is tilted from the nominal orientation to the second tilted orientation. In other words, in a similar way to the second conduit lock portion, if the fuel surface plane described above remains above a part of the first conduit lock portion that is nearest to the second side, then the first conduit lock portion may act as a fluid lock to prevent gas from the ullage space above the fuel surface in the chamber from entering the collector via the first conduit.

By providing both the first and second conduit lock portions, there may be a reduced likelihood of gas from the ullage space entering the collector when the fuel tank is tilted to the first and/or second tilted orientations, such as when the aircraft is pitched upwards and/or downwards. This may advantageously ensure that fuel can be continually extracted from the collector (and the chamber), during manoeuvres of the aircraft that cause the fuel tank to be tilted to the first and/or second tilted orientations. This may also reduce a likelihood of gas being passed to components downstream of the collector, such as pumps, fuel tanks, and/or engines, during such manoeuvres, which may improve a longevity of those components.

Optionally, at least a part of the second conduit lock portion is located substantially level to, such as adjacent to, or is below the first conduit opening and/or the second conduit opening relative to the base. In this way, the second conduit lock portion is more likely to remain below the fuel surface plane when the fuel tank is tilted to the first tilted orientation. Similarly, at least a part of the first conduit lock portion, where provided, may be located substantially level to, such as adjacent to, or may be located below, the first conduit opening and/or the second conduit opening relative to the base. In this way, the first conduit lock portion is more likely to remain below the fuel surface plane when the fuel tank is tilted to the second tilted orientation.

Optionally, the second conduit lock portion extends at least partially within the chamber from the second conduit opening towards the first side. Alternatively, or in addition, the second conduit lock portion extends at least partially external to the chamber from the second conduit opening towards the first side. Optionally, the first conduit lock portion, where provided, extends at least partially within the chamber from the first conduit opening towards the second side. Alternatively, or in addition, the first conduit lock portion extends at least partially external to the chamber from the first conduit opening towards the second side.

Optionally, the first conduit opening is distanced from the first side, in a longitudinal direction between the first and second sides, by a first conduit opening distance. Optionally, a part of the second conduit lock portion that is nearest to the first side is distanced from the first side, in the longitudinal direction, by a second conduit lock distance. Optionally, the second conduit lock distance is from 75% to 125% of the first conduit opening distance.

In this way, the second lock portion may be closer to, or further away from, the first side than the first opening. Optionally, the second conduit lock distance is from 80% to 120% of the first conduit opening distance, such as from 90% to 110% of the first conduit opening distance, such as from 95% to 105% of the first conduit opening distance, or is substantially equal to the first conduit opening distance. In this way, when the fuel tank is tilted to the first tilted orientation, the second conduit lock portion is more likely to remain below the fuel surface plane, and so fuel is more likely to be present in the second conduit lock portion, even as the fuel surface approaches and/or passes the first conduit opening in the chamber. In this way, gas may be prevented from entering the collector via the second conduit even as the fuel surface approaches the first conduit opening when the fuel tank is tilted to the first tilted orientation. This may increase an amount of fuel extractable from the fuel tank and/or collector, in use.

Optionally, at least a part of the second conduit lock portion that is nearest to the first side is located substantially level to, such as adjacent to, or is below, the first conduit opening relative to the base. In this way, as fuel is extracted from the collector and/or chamber, fuel may be present in the second conduit lock portion up until a point at which the fuel level in the chamber reaches and/or drops below the first conduit opening. This may, in turn, ensure that the collector is full of fuel, as described above, for as long as possible as fuel is extracted from the chamber, in use. This may also improve an amount of fuel that can be extracted from the chamber and/or the tank, and/or improve a longevity of components downstream of the collector, in a similar way to that described above.

Optionally, the second conduit opening is distanced from the first side, in the longitudinal direction, by a second conduit opening distance. Optionally, a part of the first conduit lock portion, where provided, that is nearest to the second side is distanced from the second side, in the longitudinal direction, by a first conduit lock distance. Optionally, the first conduit lock distance is from 75% to 125% of the second conduit opening distance. That is, the first conduit lock portion may be closer to, or further away from, the second side than the second opening. Optionally, the first conduit lock distance is from 80% to 120% of the second conduit opening distance, such as from 90% to 110% of the second conduit opening distance, such as from 95% to 105% of the second conduit opening distance, or is substantially equal to the second conduit opening distance. In this way, when the fuel tank is tilted to the second tilted orientation, the first conduit lock portion, where provided, is more likely to remain below the fuel surface plane, and so fuel is more likely to be present in the first conduit lock portion, even as the fuel surface approaches and/or passes the second conduit opening in the chamber. In this way, gas may be prevented from entering the collector via the first conduit even as the fuel surface approaches the second conduit opening when the fuel tank is tilted to the second tilted orientation. This may increase an amount of fuel extractable from the fuel tank and/or collector, in use.

Optionally, at least a part of the first conduit lock portion that is nearest to the second side is located substantially level to, such adjacent to, or is located below, the second conduit opening relative to the base. In this way, as fuel is extracted from the collector and/or chamber, fuel may be present in the first conduit lock portion up until a point at which the fuel level in the chamber reaches and/or drops below the second conduit opening. This may, in turn, ensure that the collector is full of fuel, as described above, for as long as possible as fuel is extracted from the chamber, in use. This may also improve an amount of fuel that can be extracted from the chamber and/or the tank, and/or improve a longevity of components downstream of the collector, in a similar way to that described above.

Optionally, the fuel tank comprises a trough comprising the base, the trough extending from the first side to the second side in the chamber, and wherein the first and second conduit openings open into the trough. In this way, fuel in the chamber may collect in the trough, even as the fuel tank is rotated about a longitudinal axis aligned with the first and second sides. In other words, the trough at least in part defines at least one natural low point in the chamber. By providing the first and second openings into the trough, and thus into the at least one natural low point, the first and second conduits may be more likely to be submerged in as the fuel tank is rotated along the longitudinal axis. This may allow fuel to be extracted from the chamber throughout a greater range of motion of the fuel tank, such as due to manoeuvres of an aircraft comprising the fuel tank, in use.

More specifically, a lower portion of the trough may comprise at least a part of the base that is flanked by flanking surfaces which extend at least partially upwardly away from the base. Alternatively, or in addition, the lower portion may comprise an apex extending between the first and second sides, the apex being defined by an intersection of the flanking surfaces.

Optionally, the fuel tank comprises a third side and an opposing fourth side, each of the third and fourth sides extending between the first and second sides. Optionally, the fuel tank comprises a first lateral sloped surface extending in the chamber between the third side and the base. Optionally, the fuel tank comprises a second lateral sloped surface extending in the chamber between the fourth side and the base.

The first and second lateral sloped surfaces may at least in part define the trough, where provided. For instance, the trough may comprise a lower portion comprising a channel that is defined between intersections of the first and second lateral sloped surfaces with the base. Alternatively, or in addition, the lower portion may comprise an apex extending between the first and second sides, the apex being defined by an intersection of the first and second lateral sloped surfaces. The first and/or the second conduit opening may open into the trough, such as into the lower portion of the trough. In this way, the first and/or the second conduit opening is more likely to remain submerged in fuel in the chamber as the fuel tank is tilted and/or rotated as described above. This may improve an amount of fuel that can be extracted from the chamber, and/or reduce a likelihood of gas from the chamber passing into the collector and/or components downstream of the collector, in use, as described above.

One or each of the first and second lateral sloped surfaces may be orientated at a lateral angle, $\alpha$, to a horizontal plane that is substantially aligned with the base. In such a case, fuel in the chamber will collect in the trough, such as at the lower portion, at least until the fuel tank is rotated along the longitudinal axis by the lateral angle $\alpha$. This may allow fuel to continue to be extracted from the chamber via one or both of the first and second conduit openings as the fuel tank is rotated as such, particularly when the respective first and second conduit openings open into the trough.

Optionally, the fuel tank comprises a first longitudinal sloped surface extending between the first side and the base. Optionally, the fuel tank comprises a second longitudinal sloped surface extending between the second side and the base.

In this way, a first intersection between the first longitudinal sloped surface and the base and a second intersection between the second longitudinal sloped surface and the base may define respective low points for fuel in the chamber when the chamber is tilted towards the respective second and/or first tilted orientations. This may allow fuel to collect at the respective low points via the first and second conduits when the chamber is tilted as such, which may allow the fuel to be extracted from the chamber in proximity to the respective low points. This may increase an amount of fuel that can be extracted from the chamber, in use.

Providing the first and second longitudinal sloped surfaces may be particularly beneficial when the fuel tank and/or the chamber is substantially spherocylindrical, such as when one or both of the first and second sides is substantially hemispherical. In such a case, in the absence of the first and second longitudinal sloped surfaces, a "low point" in the chamber changes continuously as the fuel tank is tilted towards the first and/or the second tilted orientation. By providing the first and second longitudinal sloped walls, there may be fewer low points present in the chamber.

The first longitudinal sloped surface may extend upwardly away from the base at a longitudinal angle, $\beta$, from a horizontal plane that is substantially aligned with the base. In this way, fuel in the chamber may collect in a first region in proximity to the first intersection, at least until the fuel tank is tilted from the nominal position towards the first tilted orientation by an amount equal to or greater than the longitudinal angle, $\beta$. That is, fuel in the chamber may collect in the first region at least until the first longitudinal sloped surface is substantially orthogonal to the direction of gravity. Similarly, the second longitudinal sloped surface may extend upwardly away from the base at the longitudinal angle, $\beta$. In this way, fuel in the chamber may collect in a second region in proximity to the second intersection at least until the fuel tank is tilted from the nominal position towards the second tilted orientation by an amount equal to or greater than the longitudinal angle, $\beta$. That is, fuel in the chamber may collect in the second region at least until the second longitudinal sloped surface is substantially orthogonal to the direction of gravity.

The longitudinal angle, $\beta$, may be up to 40°, up to 30°, up to 20°, up to 10°, or up to 5°. It will be appreciated that these values may, respectively, allow fuel to collect in the respective first and second regions up to an angle of tilt of the fuel tank of up to 40°, up to 30°, up to 20°, up to 10°, or up to 5°.

Similarly, in the event the fuel tank is tilted to the second tilted orientation, fuel in the chamber may collect in the trough in the second region, located in proximity to an intersection between the second sloped wall and the base, or between the second sloped wall and the lower portion (such as the apex), where provided. In other words, the first and second regions may define respective natural low points in the trough, which may be the only two natural low points in the trough.

Optionally, the fuel tank comprises a first intersection between the first sloped surface and the base, and a second intersection between the second sloped surface and the base. Optionally the chamber comprises a chamber height between the base and a roof of the chamber, and an intersection distance between the first and second intersections. Optionally, the first conduit opening opens into the chamber in a first region defined between the base, the first sloped surface, a first plane that is 35% of the chamber height from the base towards the roof, and a second plane that is 35% of the intersection distance from the first intersection towards the second intersection.

In this way, the first conduit opening opens into the chamber closer to the base than to the roof, and closer to the first sloped surface than to the second sloped surface. Optionally, the first plane is 30%, 25%, 20%, 15%, 10%, or 5% of the chamber height away from the base towards the roof. Optionally, the second plane is 30%, 25%, 20%, 15%, 10%, or 5% of the intersection distance from the first intersection towards the second intersection.

Optionally, the second conduit opening opens into the chamber in a second region defined between the base, the second sloped surface, the first plane, and a third plane that is 35% of the intersection distance from the second intersection towards the first intersection. Optionally, the third plane is 30%, 25%, 20%, 15%, 10%, or 5% of the intersection distance away from the second intersection towards the first intersection.

In this way, the first and second regions represent respective natural low-points for fuel to collect in the chamber, particularly as the fuel tank is tilted to the respective first and second tilted orientations. By locating the first and/or second conduit openings in proximity to respective natural low-points in the chamber, the respective first and/or second conduit openings are more likely to be submerged in fuel in the chamber, in use, even as the fuel tank is tilted and/or rotated as described above.

At least a part of the second conduit lock portion may be located in the first region. At least a part of the first conduit lock portion may be located in the second region. In this way, fuel may be more likely to remain in the first and/or second lock portion as the fuel surface in the chamber approaches the respective second and/or first regions as the fuel is extracted from the chamber, in use. This may provide the advantages described above.

It will be appreciated that when the first and second sloped surfaces are provided in combination with the first and second lateral sloped surfaces, the first and second regions may be the only two natural low-points in the chamber, at least when the fuel tank is tilted up to the longitudinal angle, $\beta$, or rotated up to the lateral angle, $\alpha$, from the nominal orientation. Locating the first and second conduit openings in the respective first and second regions may therefore increase a likelihood that at least one of the first and second conduit openings is submerged in fuel in the fuel tank during manoeuvres of an aircraft comprising the fuel tank that cause the fuel tank to be tilted and/or rotated as such.

Optionally, the aircraft fuel storage system comprises a first void space below the first longitudinal sloped surface and a second void space below the second longitudinal sloped surface. Optionally, the first and second longitudinal sloped surfaces fluidically isolate the respective first and second void spaces from the chamber. Optionally, the first and second void spaces are fluidically coupled to the chamber by at least one vent conduit.

By coupling the void spaces to the chamber via the at least one vent conduit, a pressure difference between the void space and the chamber may be reduced. This may be particularly advantageous when the chamber is configured to store pressurised fuel, such as when the chamber is a pressure vessel.

Optionally, the at least one vent conduit opens into a top of the chamber, opposite the base. In this way, the at least one vent conduit may open into an ullage space above a level of fuel in the chamber. This may fluidically connect the first and second vent spaces to the ullage space. The vent conduit may be configured so that fuel is restricted, or prevented, from passing from the chamber to the void spaces, in use. In this way, the void spaces may define at least a part of an ullage space of the aircraft fuel storage system. By utilising the first and second void spaces below the respective first and second sloped surfaces as "additional" ullage space, a maximum level of fuel in the chamber may be increased. This may particularly be the case when a minimum amount of ullage space must be provided in the fuel tank, as might be required by airworthiness regulations. Increasing a maximum level of fuel in the chamber may further increase a likelihood that at least one of the first and second conduit openings is submerged in fuel, in use.

The first and second void spaces may be fluidically coupled to each other, such as via the at least one vent conduit. The aircraft fuel storage system may comprise third and/or fourth void spaces below the respective third and/or fourth sloped surfaces, where provided. The first, second, third and fourth void spaces, where provided, may be fluidically coupled to each other, such as via the at least one vent conduit.

Optionally, the aircraft fuel storage system comprises one or more baffles in the chamber. The baffles may inhibit sloshing of fuel in the chamber during movement of the fuel tank. This may further increase a likelihood that at least one of the first and second conduit openings is submerged in fuel during movement of the fuel tank, such as during manoeuvres of the aircraft.

Optionally, the collector is located with the base between the collector and the rest of the chamber. Optionally, the collector is located below the fuel tank in the normal orientation of the fuel tank. By locating the collector below the base of the chamber, fuel may be able to flow, such as under the action of gravity, to the collector via the respective first and second conduits. This may particularly be the case when the fuel tank is in the nominal orientation. Moreover, this may be the case even if a part of the first and/or the second conduit extends above the respective first and/or second conduit opening relative to the base, particularly when the respective first and/or second conduit is full of fuel. In that case, a siphoning effect due to a difference in height between a surface of fuel in the chamber and fuel in the collector may cause the fuel to flow from the chamber to the collector via the respective first and/or second conduit.

Optionally, the first and second conduits are sized so as to restrict flow rate of fuel from the collector to the fuel tank in the event that the fuel tank is subject to an upward acceleration, away from the base. Such an acceleration may occur, for example, when an aircraft performs a negative-G manoeuvre, such as a manoeuvre that causes a −1G acceleration of the fuel tank (where G is an acceleration due to gravity). In particular, the first and second conduits may be sized to contain an amount of fuel such that only the amount fuel in the conduits is passed to the chamber during a negative-G manoeuvre that is sustained for up to, or greater than, 5 seconds. In this way, the first and second conduits may act as fuel buffers, to ensure the collector remains full of fuel even in the event of such a sustained −1G manoeuvre.

Optionally, the chamber is hermetically sealed. In other words, the chamber may not be vented to an atmosphere surrounding the chamber. This may allow the chamber to be used for storing fuels such as hydrogen fuel, which should not be exposed to oxygen-containing air external to the chamber. Optionally, the chamber is a pressure vessel, which may be configured to store pressurised fuel in the chamber, such as pressurised hydrogen fuel.

Optionally, the aircraft fuel storage system comprises hydrogen fuel in the chamber. The aircraft fuel storage system may be particularly advantageous for storing hydrogen fuel, which is typically pressurised fuel and is stored under cryogenic conditions. In particular, with the arrangement of the first and second conduits, which allow fuel to flow freely from the chamber to the collector, there may be no need to provide pumps in (or opening into) the chamber for passing fuel to the collector. This may reduce a likelihood of the hydrogen fuel vaporising due to low pressures caused by such pumps, particularly if a temperature of the hydrogen fuel in the chamber is close to a saturation temperature of the hydrogen fuel, which may occur as the hydrogen fuel heats up over the course of a flight of an aircraft comprising the fuel tank. This may further reduce a likelihood of gas, such as vaporised hydrogen fuel, entering the collector. This may, in turn, prevent such gas from being passed to components downstream of the compressor, which provides the advantages discussed above.

A second aspect of the present invention provides an aircraft comprising the aircraft fuel storage system of the first aspect. It will be appreciated that the aircraft may comprise and/or benefit from any of the optional features and/or advantages of the aircraft fuel storage system of the first aspect.

BRIEF DESCRIPTION OF THE DRAWINGS

Embodiments of the invention will now be described, by way of example only, with reference to the accompanying drawings, in which.

DETAILED DESCRIPTION

Figures 1A, 1B, 1C:
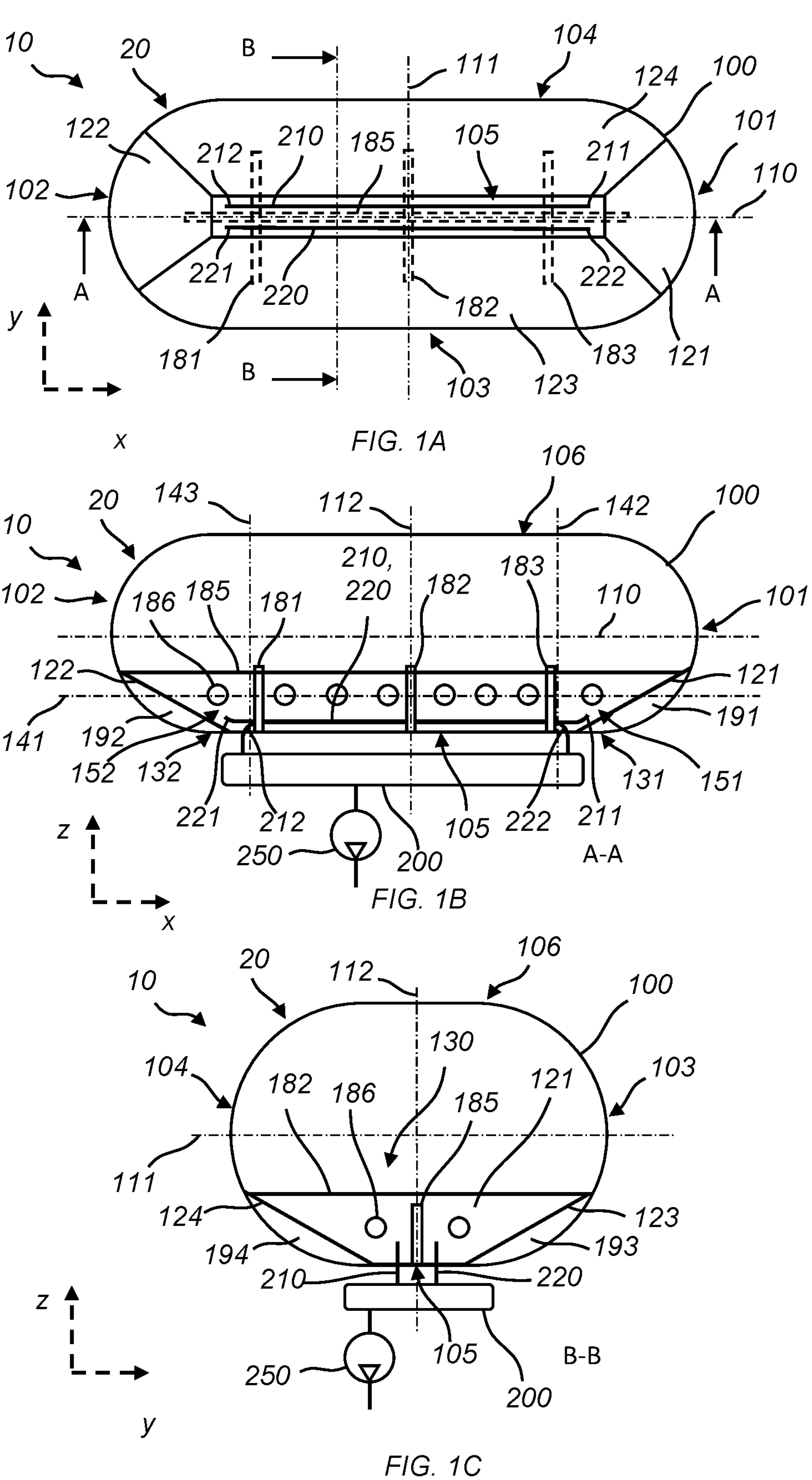
FIG. 1A shows a top-down schematic view of a fuel storage system according to an example.
FIG. 1B shows a cross-sectional schematic side view of the fuel storage system of FIG. 1A along the plane A-A shown in FIG. 1A.
FIG. 1C shows a cross-sectional schematic end view of the fuel storage system of FIGS. 1A and 1B along the plane B-B shown in FIG. 1A.
Figure 4:
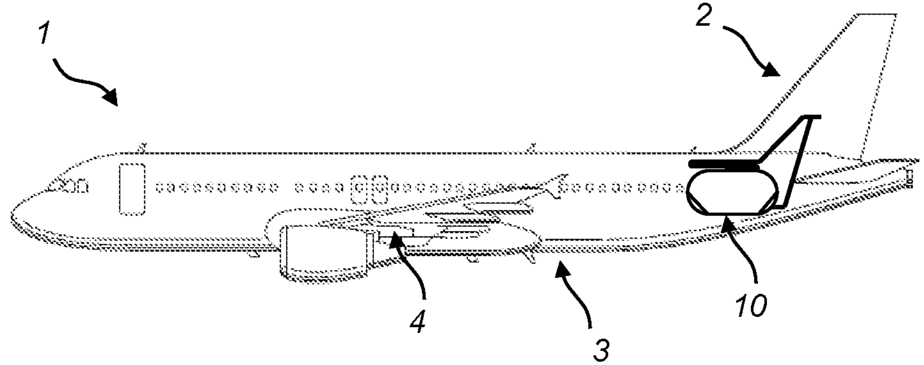
FIG. 4 shows an aircraft comprising the fuel storage system of FIGS. 1A to 1C, FIG. 2 and FIG. 3.

FIGS. 1A to 1C show different views of an aircraft fuel storage system 10, according to an example. The aircraft fuel storage system 10 comprises a fuel tank 20 comprising a chamber 100 for storing fuel for an aircraft 1, which is shown in FIG. 4 and will be described in more detail below.

The chamber 100 comprises a first side 101, a second side 102, and a base 105 connecting the first side 101 to the second side 102. The chamber 100 also comprises a third side 103 and an opposing fourth side 104. Each of the third and fourth sides 103, 104 extends between the first and second sides 101, 102. The chamber 100 also comprises a roof 106 opposite the base 105. The first, second, third and fourth sides 101, 102, 103, 104 in the present example are substantially concave in shape, while the base 105 and the roof 106 are substantially flat. The chamber 100 is, in the present example, a pressure vessel that is configured to store pressurised hydrogen fuel. That is, the aircraft fuel storage system 10 is configured to store hydrogen fuel for the aircraft 1, and thus may be considered an aircraft hydrogen-fuel storage system 10.

The axes shown in FIGS. 1A to 1C comprise an x-direction, a y-direction and a z-direction. The x-direction is in a longitudinal direction parallel to a longitudinal axis 110 passing through the second side 102 and the first side 101. The y-direction is in a lateral direction parallel to a lateral axis 111 passing through the third side 103 and the fourth side 104. The z-direction is a vertical direction parallel to a vertical axis 112 passing through the base 105 and the roof 106. FIG. 1A shows the aircraft fuel storage system 10 in a top-down view in the z-direction, with the roof 106 omitted to more clearly show the inside of the chamber 100. FIG. 1B shows a cross-sectional view A-A through the fuel tank 20 in the y-direction, while FIG. 1C shows a cross-sectional view B-B through the fuel tank 20 in the x-direction. The fuel tank 20 is shown in FIGS. 1A to 1C in a nominal orientation, in which the z-direction is in a direction of gravity acting on the fuel tank 20.

As best shown in FIG. 1B, the fuel tank 20 comprises a first sloped surface 121 extending from the first side 101 to the base 105, and a second sloped surface 122 extending from the second side 102 to the base 105. Each of the first and second sloped surfaces 121, 122 extends upwardly away from the base 105 at an angle of about 30° from the base 105. As best shown in FIG. 1C, the fuel tank 20 comprises a third sloped surface 123 extending from the third side 103 to the base 105, and a fourth sloped surface 124, extending from the fourth side 104 to the base 105. Each of the third and fourth sloped surfaces 123, 124 extends upwardly away from the base 105 at an angle of about 30° from the base 105. It will be appreciated that, in other examples, each of the first, second, third, and fourth sloped surfaces 121, 122, 123, 124 may extend upwardly away from the base at any other suitable angle, such as an angle of up to or greater than 50°, up to 40°, up to 30°, up to 20°, or up to 10°.

The third and fourth sloped surfaces 123, 124 at least in part define a trough 130 extending between the first and second sides 101, 102 (and between the first and second sloped surfaces 121, 122). In this way, fuel in the chamber 100, in use, is able to collect in the trough 130 even as the fuel tank 20 is rotated, from the nominal orientation, around the longitudinal axis 110 by an angle of up to about 30° in either direction. Moreover, fuel in the chamber 100, in use, is able to collect at a first intersection 131 between the first sloped surface 121 and the base 105 when the fuel tank 20 is tilted about the lateral axis by an angle of up to about 30° so that the second side 102 is raised relative to the first side 101. Similarly, fuel in the chamber 100, in use, can collect at a second intersection 132 between the second sloped surface 122 and the base 105 when the fuel tank 20 is tilted about the lateral axis 111 by an angle of up to about 30° so that the first side 101 is raised relative to the second side 102.

The fuel tank 20 also comprises a collector 200 located below the base 105 of the chamber 100, so that the base 105 is located between the collector 200 and the rest of the chamber 100. The fuel tank 20 comprises first and second conduits 210, 220 which fluidically couple the collector 200 to the chamber 100, so that fuel can pass freely between the chamber 100 and the collector 200. In other words, fuel can pass from the chamber 100 to the collector 200 via the first and second conduits 210, 220 under the action of gravity and/or under the effect of a siphon, without requiring a fluid mover. In this way, no pumps may be present or required, such as in the chamber 100 and/or coupled between the first and/or second conduit openings 211, 221 (discussed below) and the collector 200, to cause the fuel to flow from the chamber 100 to the collector 200 via the first and/or second conduits 210, 220. The collector 200 is otherwise fluidically isolated form the chamber 100, except for the first and second conduits 210, 220. The aircraft fuel storage system 10 further comprises a pump 250, which here is a centrifugal pump, for moving fuel from the collector 200 to components downstream of the pump 250, such as towards an engine or another fuel tank of the aircraft 1. In other examples, the pump 250 may comprise any other suitable pump, such as a reciprocating pump.

The first and second conduits 210, 220 open into the chamber 100 at respective first and second conduit openings 211, 221. The first conduit opening 211 is located nearer to the first side 101 than to the second side 102, and particularly opens into a first region 151 in proximity to the first intersection 131. The second conduit opening 221 is located nearer to the second side 102 that to the first side 101, and in particular opens into a second region 152 in proximity to the second intersection 132. More specifically, the chamber comprises a chamber height between the base 105 and the roof 106, and an intersection distance between the first intersection 131 and the second intersection 132. As best shown in FIG. 1B, the first region 151 is, in the present example, defined between the base 105, the first sloped surface 121, a first plane 141 that is 20% of the chamber height away from the base towards the roof 106, and a second plane 142 that is 10% of the intersection distance away from the first intersection 131 towards the second intersection 132. The second region 152 is, in the present example, defined between the base 105, the second sloped surface 122, the first plane 141, and a third plane 143 that is 10% of the intersection distance away from the second intersection 132 towards the first intersection 131. The first and second regions 151, 152 are also each defined between the third and fourth sloped surfaces 123, 124 in the y-direction. In this way, the first and second regions 151, 152 may at least in part define and contain natural low-points in the chamber 100, particularly as the fuel tank 20 is tilted around the lateral axis 111 and/or rotated around the longitudinal axis 110, as described above. By locating the first and second conduit openings 211, 221 in the respective first and second regions 151, 152, at least one of the first and second conduit openings 211, 222 is more likely to be submerged in fuel in the chamber 100 as the fuel tank 20 is tilted and/or rotated as such.

The first conduit 210 extends within the chamber 100 from the first region 151 to the second region 152, and the second conduit 220 extends within the chamber 100 from the second region 152 to the first region 151. The first and second conduits 210, 220 then pass through the base 105 from the respective second and first regions 152, 151 into the collector 200. In this way, a portion of the first conduit 210 that is located in the second region 152 at least in part defines a first conduit lock portion 212 of the first conduit 210. Similarly, a portion of the second conduit 220 that is located in the first region 151 at least in part defines a second conduit lock portion 222 of the second conduit 220.

It will be appreciated that, in the nominal orientation of the fuel tank 20 shown in FIGS. 1A to 1C, and when the first and second conduit openings 211, 221 are submerged in fuel in the chamber 100, fuel can flow from the chamber 100 to the collector 200 via the first and second conduits 210, 220 under the action of gravity, and/or due to a pressure reduction in the collector 200 due to operation of the pump 250.

Figure 2:
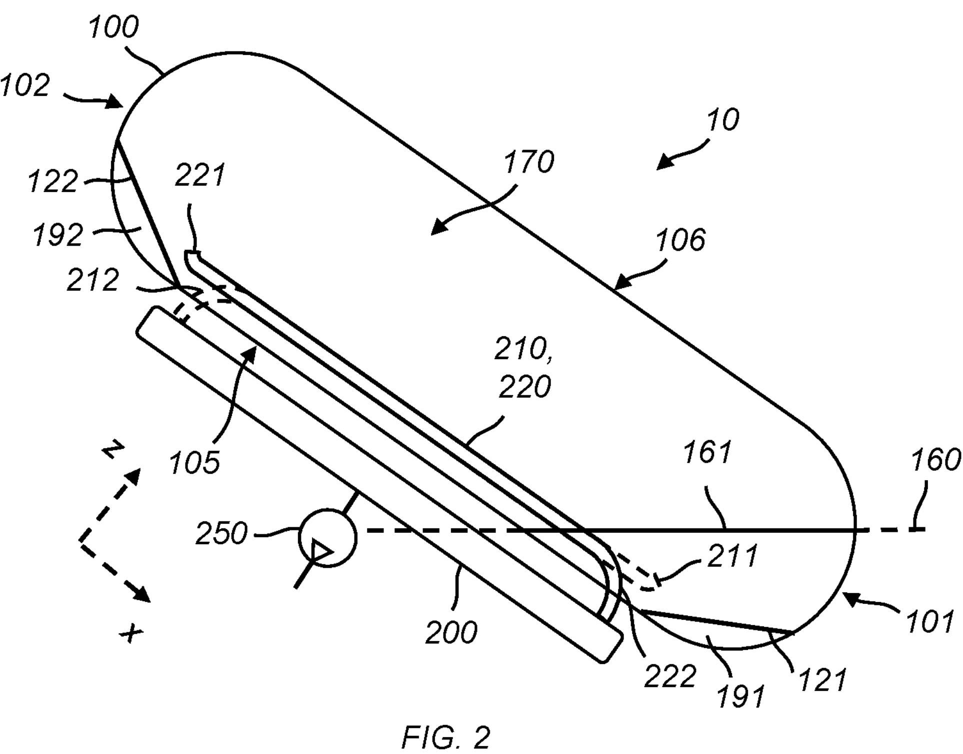
FIG. 2 shows a schematic view of the fuel storage system of FIGS. 1A to 1C in a tilted orientation.

As shown in FIG. 2, which, for improved visual clarity, does not show some of the components of the aircraft fuel storage system that are shown in FIGS. 1A to 1C, and depicts (partially) the first conduit 210 with dashed lines to help distinguish it from the second conduit 220, the fuel tank 20 can be tilted around the lateral axis 111 from the nominal orientation to a first tilted orientation, in which the second side 102 is raised above to the first side 101 relative to a direction of gravity. In the first tilted orientation, a fuel surface plane 160 (which generally defines a height, or level 161, of fuel in the chamber 100 relative to the direction of gravity) may drop below the second conduit opening 221 but remain above the first conduit opening 211. In other words, the second conduit opening 221 may open into an ullage space 170 above the fuel surface plane 160. By providing the second conduit lock portion 222, fuel can remain in the second conduit 220 up to the height of the fuel surface plane 160 in the direction of gravity. That is, so long as the second conduit lock portion 222 remains below the fuel surface plane 160, in use, fuel may be present in the second conduit 220.

Moreover, in the first tilted orientation of the fuel tank 20 as shown in FIG. 2, the first conduit 210 may remain substantially full of fuel due to a siphon effect provided by the second conduit lock portion 222, the collector 200, and the first conduit 210. In particular, a negative pressure will be present in the first conduit lock portion 212 due to fuel being present in the collector 200 and the second conduit lock portion 222, which will prevent fuel from flowing out of the first conduit 210 into the chamber 100. For ease of understanding only, the collector 200 and the first conduit lock portion 212 may be considered to form a siphon between the second conduit 220 and the fuel chamber 100. In this way, in accordance with the principles of siphons, if the fuel surface plane 160 in the chamber 100 is at any point above a level of fuel in the second conduit 220, in the direction of gravity, fuel will be siphoned from the chamber 100 to the second conduit 220 until the level of fuel in the second conduit 220 is aligned with the fuel surface plane 160. Alternatively, if a level of fuel in the siphon were to be above the fuel surface plane 160, fuel would be siphoned from the second conduit 220 to the chamber 100 until the fuel level in the chamber 100 matches the fuel surface plane 160. In this way, the collector 200 always remains full of fuel, even as the fuel tank 20 is tilted to the first tilted orientation. Thus, when the pump 250 is operated to extract fuel from the collector 200, fuel may be drawn from the chamber 100 via the first conduit 210, and a level of fuel in the second conduit lock portion 222 may drop in conformation with a drop in the fuel surface plane 160.

It will be appreciated that the same principles apply when the fuel tank 20 is tilted in the opposite direction to that shown in FIG. 2 around the lateral axis 111 from the nominal orientation. In that case, the first conduit opening 211 may open into the ullage space 170 while the second conduit opening 221 and the first conduit lock portion 212 both remain below the fuel surface plane 160 in the chamber 100. The first conduit lock portion 212 will therefore contain fuel, producing a siphon effect between fuel in the first conduit 210 and fuel in the chamber 100 in a similar way as described above.

It will be appreciated that, if the fuel surface plane 160 were to drop below the second conduit lock portion 222 in the first tilted orientation, then gas from the ullage space 170 would be able to enter the collector 200 via the second conduit 220. No such siphon effect would therefore be provided, and fuel in the first conduit 210 would pass into the chamber 100. This may lead to gas being present in the collector 200, and/or a level of fluid in the collector 200 dropping, which may detrimentally affect operation of the aircraft fuel storage system 10. As such, in the present example, the first and second conduit lock portions 212, 222 extend below the respective second and first conduit openings 221, 211 in the respective first and second regions 151, 152. In this way, fuel will always be present in the first and second conduit lock portions 212, 222, so long as the respective second and first conduit openings 221, 211 remain submerged in fuel. The first and second conduit lock portions 212, 222 may therefore provide fluid locks to prevent gas from the ullage space 170 entering the collector 200 as the fuel tank 20 is tilted to the respective second and first tilted orientations.

The first and second conduits 210, 220 are sized to contain enough fuel such that only fuel from the first and second conduits 210, 220 passes into the chamber 100 during a sustained negative-G manoeuvre of the aircraft 1, which causes the fuel in the chamber 100 to accelerate upwardly relative to the base 105. One such manoeuvre is a −1G manoeuvre, in which the fuel in the chamber 100 experiences an acceleration of −1G upwardly (where "G" is a measure of the acceleration due to gravity, which is here 9.84 $m/s^2$). The first and second conduits 210, 220 are, in particular, so sized to accommodate enough fuel for a −1G manoeuvre sustained for up to seven seconds. A smaller diameter of the first and second conduits 210, 220 may cause a flow rate of fuel through the respective first and second conduits 210, 220 to reduce, and thereby reduce an amount of fuel passing from the collector 200 to the chamber 100 during a negative-G manoeuvre. However, an increase in the diameter of the first and second conduits 210, 220 may reduce a pressure drop of fuel passing from the collector 200 to the chamber 100 via the respective first and second conduits 210, 220, in use. A larger diameter can also reduce a velocity of fluid flowing through the first and/or the second conduit 210, 220 as the fuel tank 20 is tilted around the lateral axis 111. For instance, when the fuel tank 20 is tilted to the second orientation, fuel may pass through the second conduit 220 towards the second conduit lock portion 222 in correspondence to the fuel surface plane 160 in the chamber 100. Reducing a velocity of fuel flowing through the second conduit 220 may reduce an amount to which the level of fuel in the second conduit 220 initially overshoots the fuel surface plane 160, which may reduce a likelihood of gas from the ullage space 170 entering the collector 200 via the second conduit 220.

The fuel tank 20 comprises three lateral baffles 181, 182, 183, each extending between the third and fourth sides 103, 104 and the respective third and fourth sloped surfaces 123, 124. The fuel tank 20 also comprises a longitudinal baffle 185 extending between the first and second sides 101, 102, and between the respective first and second sloped surfaces 121, 122. The baffles 181, 182, 183, 185 together act to reduce a sloshing motion of fuel in the chamber 100 as the fuel tank 20 is moved, in use. The baffles 181, 182, 183, 185 each comprise apertures 186 to restrict, but still allow, a movement of fuel between compartments in the chamber 100 formed by the baffles 181, 182, 183, 185. The first and second conduits 210, 220 here pass through the lateral baffles 181, 182, 183 and are located on either side of the longitudinal baffle 185.

In the illustrated example, the fuel tank 20 comprises first, second, third and fourth void spaces 191, 192, 193, 194 each located below the respective first, second, third and fourth sloped surfaces 121, 122, 123, 124. The first, second, third and fourth void spaces 191, 192, 193, 194 are each fluidically isolated from the chamber 100 by the respective first, second, third and fourth sloped surfaces 121, 122, 123, 124. While not shown in the Figures, the first, second, third, and fourth void spaces 191, 192, 193, 194 are fluidically coupled to one another, such as by: conduits; an absence of internal walls separating the first, second third, and fourth void spaces 191, 192, 193, 194, and/or by the presence of gaps, apertures or holes in such walls, when provided. As such, for brevity, we herein refer to a single "void space 190" in the fuel tank 20, which comprises the first, second, third and fourth void spaces 191, 192, 193, 194.

Figure 3:
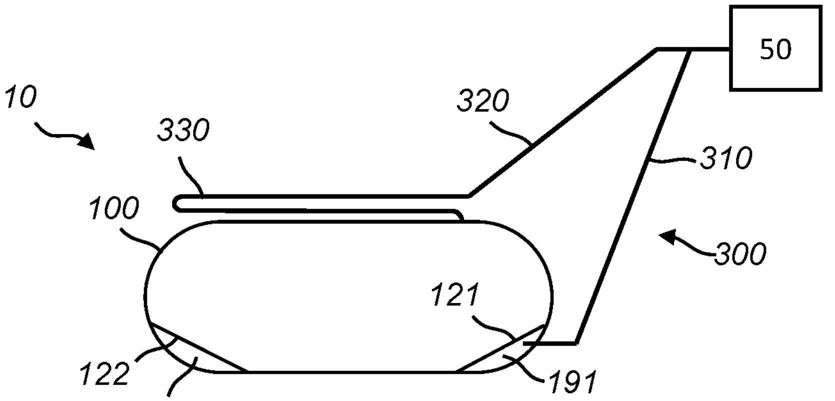
FIG. 3 shows a schematic view of the fuel storage system of FIGS. 1A to 1C and FIG. 2, detailing a vent system of the fuel storage system.

While not shown in FIGS. 1A to 1C, or FIG. 2, the aircraft fuel storage system 10 comprises a vent system 300 that fluidically couples the void space 190 to the chamber 100. As shown in FIG. 3, the vent system 300 opens into the chamber 100 in proximity to the roof 106, so that the vent system 300 opens into an ullage space 170 in the fuel tank 20, at least when the fuel tank 20 is in the nominal orientation. Fluidically coupling the ullage space 170 to the void space 190 may allow a minimum ullage space 170 in the chamber 100 to be reduced, as gas from the ullage space can instead be accommodated in the void space 190 and the vent system 300. Moreover, by coupling the void space 190 to the chamber 100, a pressure difference between the void space 190 and the chamber 100 can be reduced, or eliminated. This is particularly beneficial when storing pressurised hydrogen fuel under cryogenic conditions in the chamber 100, as this will reduce a likelihood of damage to the first, second, third and/or fourth sloped surface 121, 122, 123, 124.

The vent system 300 more specifically comprises a first vent portion 310, here shown extending from the first void space 190 to a location above the roof 106 of the chamber 100. The vent system 300 further comprises a second vent portion 320, which is fluidically coupled to the first vent portion 310 at the location, and opens into the chamber 100 closer to the first side 101 than to the second side 102. The second vent portion 320 also comprises a loop portion 330 that extends towards the second side 102 of the chamber, before looping back towards the first side 101. By providing the first and second portions 310, 320 above the roof 106 of the chamber 100, and by providing the loop portion 330, an amount of fuel passing from the chamber 100 towards the void space 190 via the vent system 300 may be reduced, or prevented. In particular, during a negative-G manoeuvre such as that described above, the loop portion may restrict a flow of fuel towards the void space 190 via the vent system 300.

The vent system 300 in the present example is coupled to a vapour system 50 configured to provide vaporous hydrogen fuel to the chamber 100, in particular to the ullage space 170, and to the void space 190, as fuel is extracted from the chamber 100. This can maintain a pressure of fuel in the fuel chamber 100 as fuel is extracted from the chamber 100, which can help to ensure that as more of the fuel in the chamber 100 remains in the liquid phase.

FIG. 4 shows an example aircraft 1 comprising the aircraft fuel storage system 10. The aircraft fuel storage system is here located towards a rear of the aircraft 1, and in particular in proximity to a tail 2 of the aircraft 1.

It will be appreciated that variations and modifications may be made to the example aircraft fuel storage system 10 and/or aircraft 1 described above within the scope of the appended claims. For example, the aircraft fuel storage system 10, or at least the fuel tank 20, may be located in any other suitable part of the aircraft 1, such as a main body 3 of the aircraft 1, and/or in a wing 4 of the aircraft 1. In other examples, the chamber 100 may be of any suitable shape. For example, the chamber 100 may be substantially sphero-cylindrical, cuboidal, or any other suitable shape. By way of further example, the first and/or second sides 101, 102 may be shaped as flattened hemispheres, or may be substantially flat or curved walls that meet the base 105 at relatively steep angles, such as angle of up to 135° when measured from the base 105. This may improve the likelihood of fuel collecting at the respective first and second regions 151, 152, in use. In some examples, the fuel tank 20 may comprise an outer shell containing the chamber 100, such as an outer shell surrounding the first side 101, the second side 102, the third side 103, the fourth side 104, the roof 106, and the base 105. This may improve a strength of the fuel tank 20, and/or allow the fuel tank 20 to be mounted in the aircraft 1 with greater ease and/or rigidity. The outer shell may also at least in part provide insulation for the chamber 100, which may reduce heat transfer from cryogenic hydrogen fuel in the chamber 100 to a warmer atmosphere surrounding the fuel tank 20, in use.

In some examples, there may be any other suitable number of baffles 181, 182, 183, 185 in the chamber 100, such as more than one longitudinal baffle 185, or greater than or less than three lateral baffles 181, 182, 183. In other examples, each of the first and second conduits 210, 220 may be located on the same side of the longitudinal baffle 185 and/or may pass beneath the lateral baffles 181, 182, 183, such as by the lateral baffles 181, 182, 183 each comprising a respective cut-out on a lower side of the respective lateral baffles 181, 182, 183.

In other examples, the first conduit 210 may extend from the first region 151 to the second region 152, and then back towards the first region 151. Alternatively, or in addition, the first conduit 210 may pass from the first region 151 to the second region 152, back to the first region 151, and then back to the second region 152, before entering the collector 200. For example, the first conduit 210 may trace out a u-shape, or an s-shape, in the chamber 100. Increasing the length of the first and/or second conduit 210, 220 as such may allow an increased diameter of the respective first and/or second conduit 210, 220, so as to reduce a pressure loss encountered by fuel passing through the first conduit 210 while allowing the first conduit 210 to contain enough fuel for a sustained negative-G manoeuvre, as discussed above. The second conduit 220 may be similarly shaped, and may provide similar advantages.

It is to be noted that the term "or" as used herein is to be interpreted to mean "and/or", unless expressly stated otherwise.

The invention claimed is:

1. An aircraft fuel storage system, comprising:

a fuel tank comprising a chamber for storing fuel, the chamber comprising a first side, a second side, and a base connecting the first side to the second side;

a collector external to the chamber;

a first conduit and a second conduit, each of the first and second conduits fluidically coupling the chamber to the collector so that fuel is freely passable from the chamber to the collector via the respective first and second conduits;

wherein the first and second conduits open into the chamber at respective first and second conduit openings, wherein the first conduit opening is nearer to the first side than the second conduit opening is to the first side;

wherein the second conduit comprises a second conduit lock portion that is nearer to the first side than the second conduit opening is to the first side; and, wherein the second conduit lock portion is configured to prevent gas from an ullage space entering the collector as the fuel tank is tilted.

2. The aircraft fuel storage system of claim 1, wherein the first conduit opening is nearer to the first side than to the second side.

3. The aircraft fuel storage system of claim 1, wherein the second conduit opening is nearer to the second side than to the first side.

4. The aircraft fuel storage system of claim 1, wherein the first conduit comprises a first conduit lock portion, which is nearer to the second side than the first conduit opening is to the second side.

5. The aircraft fuel storage system of claim 1, wherein the first conduit opening is distanced from the first side, in a longitudinal direction between the first and second sides, by a first conduit opening distance; and wherein a part of the second conduit lock portion that is nearest to the first side is distanced from the first side, in the longitudinal direction, by a second conduit lock distance; and wherein the second conduit lock distance is from 75% to 125% of the first conduit opening distance.

6. The aircraft fuel storage system of claim 1, wherein the fuel tank comprises a trough comprising the base, the trough extending from the first side to the second side in the chamber, and wherein the first and second conduit openings open into the trough.

7. The aircraft fuel storage system of claim 1, wherein the fuel tank comprises:

a third side and an opposing fourth side, each of the third and fourth sides extending between the first and second sides;

a first lateral sloped surface extending in the chamber between the third side and the base; and a second lateral sloped surface extending in the chamber between the fourth side and the base.

8. The aircraft fuel storage system of claim 1, wherein the fuel tank comprises a first longitudinal sloped surface extending between the first side and the base, and a second longitudinal sloped surface extending between the second side and the base.

9. The aircraft fuel storage system of claim 8, wherein the fuel tank comprises a first intersection between the first sloped surface and the base, and a second intersection between the second sloped surface and the base, wherein the chamber comprises a chamber height between the base and a roof of the chamber, and an intersection distance between the first and second intersections; and wherein the first conduit opening opens into the chamber in a first region defined between the base, the first sloped surface, a first plane that is 35% of the chamber height from the base towards the roof, and a second plane that is 35% of the intersection distance from the first intersection towards the second intersection.

10. The aircraft fuel storage system of claim 8, comprising a first void space below the first longitudinal sloped surface and a second void space below the second longitudinal sloped surface, wherein the first and second longitudinal sloped surfaces fluidically isolate the respective first and second void spaces from the chamber; and wherein the first and second void spaces are fluidically coupled to the chamber by at least one vent conduit.

11. The aircraft fuel storage system of claim 10, wherein the at least one vent conduit opens into a top of the chamber, opposite the base.

12. The aircraft fuel storage system of claim 1, comprising one or more baffles in the chamber.

13. The aircraft fuel storage system of claim 1, wherein the collector is located with the base between the collector and the rest of the chamber.

14. The aircraft fuel storage system of claim 1, wherein the chamber is hermetically sealed.

15. The aircraft fuel storage system of claim 1, comprising hydrogen fuel in the chamber.

16. An aircraft comprising the aircraft fuel storage system of claim 1.

17. An aircraft fuel storage system, comprising:

a fuel tank comprising a chamber for storing fuel, the chamber comprising a first side, a second side, and a base connecting the first side to the second side;

a collector external to the chamber;

a first conduit and a second conduit, each of the first and second conduits fluidically coupling the chamber to the collector so that fuel is freely passable from the chamber to the collector via the respective first and second conduits;

wherein the first and second conduits open into the chamber at respective first and second conduit openings;

wherein the first conduit opening is nearer to the first side than the second conduit opening is to the first side;

wherein the second conduit comprises a second conduit lock portion that is nearer to the first side than the second conduit opening is to the first side; and, wherein the fuel tank comprises a trough comprising the base, the trough extending from the first side to the second side in the chamber, and wherein the first and second conduit openings open into the trough.

* * * * *